(12) United States Patent
Kasuya et al.

(10) Patent No.: US 12,448,044 B2
(45) Date of Patent: Oct. 21, 2025

(54) ELECTRIC POWER STEERING DEVICE AND ASSISTING METHOD THEREOF

(71) Applicant: Honda Motor Co., Ltd., Tokyo (JP)

(72) Inventors: Kentaro Kasuya, Tokyo (JP); Shuichi Okada, Tokyo (JP); Naoaki Ikemoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 18/167,871

(22) Filed: Feb. 12, 2023

(65) Prior Publication Data

US 2023/0303166 A1 Sep. 28, 2023

(30) Foreign Application Priority Data

Mar. 24, 2022 (CN) .......................... 202210294900.6

(51) Int. Cl.
*B62D 15/02* (2006.01)
*B62D 6/00* (2006.01)
*G05B 13/02* (2006.01)

(52) U.S. Cl.
CPC ............. *B62D 15/025* (2013.01); *B62D 6/00* (2013.01); *G05B 13/0265* (2013.01)

(58) Field of Classification Search
CPC ..... B62D 15/025; B62D 6/00; G05B 13/0265
USPC .......................................................... 701/41
See application file for complete search history.

(56) References Cited

U.S. PATENT DOCUMENTS

| 5,253,172 | A * | 10/1993 | Ito ........................... | B60T 8/172 |
| | | | | 701/41 |
| 9,919,716 | B2* | 3/2018 | Christensen ......... | G06V 20/588 |
| 10,780,916 | B2* | 9/2020 | Tatsukawa ............... | B62D 6/00 |
| 11,453,394 | B2* | 9/2022 | Ohmura .................... | B62D 6/00 |
| 2014/0253309 | A1* | 9/2014 | Faeuster ............... | B60W 50/16 |
| | | | | 340/438 |
| 2015/0057889 | A1* | 2/2015 | Tamaizumi .......... | B62D 5/0463 |
| | | | | 701/41 |
| 2015/0158524 | A1* | 6/2015 | Lee ........................ | B62D 6/001 |
| | | | | 701/41 |

(Continued)

FOREIGN PATENT DOCUMENTS

| CN | 107150682 | 9/2017 |
| JP | 4720998 | 7/2011 |

OTHER PUBLICATIONS

"First Office Action of China Counterpart Application", issued on Aug. 15, 2025, with English translation thereof, pp. 1-19.

*Primary Examiner* — Logan M Kraft
*Assistant Examiner* — John D Bailey
(74) *Attorney, Agent, or Firm* — JCIPRNET

(57) ABSTRACT

An electric power steering device and an assisting method thereof are provided. A lane recognition unit recognizes lane information of a lane on which a vehicle is travelling. A steering information sensing unit senses steering information. An assisting control unit controls the electric power steering device to execute a steering assisting operation according to a steering assisting amount composed of the lane information and the steering information, and controls the electric power steering to execute the steering assisting operation according to a learned steering assisting amount composed of the steering assisting amount during a learning period when the lane information cannot be recognized.

10 Claims, 6 Drawing Sheets

(56) References Cited

U.S. PATENT DOCUMENTS

| | | | |
|---|---|---|---|
| 2015/0183460 A1* | 7/2015 | Oyama | B62D 6/00 |
| | | | 701/41 |
| 2016/0129934 A1* | 5/2016 | Akatsuka | B62D 15/025 |
| | | | 180/446 |
| 2016/0288831 A1* | 10/2016 | Lee | B62D 6/002 |
| 2017/0088167 A1* | 3/2017 | Fujii | B62D 1/286 |
| 2017/0217477 A1* | 8/2017 | Akatsuka | B62D 15/0265 |
| 2017/0242440 A1 | 8/2017 | Nakada et al. | |
| 2018/0009437 A1* | 1/2018 | Ooba | B60W 30/10 |
| 2018/0065657 A1* | 3/2018 | Hirate | B62D 5/0463 |
| 2018/0257707 A1* | 9/2018 | Isomoto | B60W 30/12 |
| 2018/0336471 A1* | 11/2018 | Rezagholizadeh | G06N 3/08 |
| 2018/0348779 A1* | 12/2018 | Oniwa | B60T 8/17557 |
| 2019/0009818 A1* | 1/2019 | Ide | B62D 15/024 |
| 2019/0071079 A1* | 3/2019 | Nishiguchi | B60W 10/20 |
| 2019/0092325 A1* | 3/2019 | Oka | B60R 21/00 |
| 2019/0210643 A1* | 7/2019 | Matsumoto | B62D 15/025 |
| 2020/0023884 A1* | 1/2020 | Mizoo | B60W 30/095 |
| 2020/0319609 A1* | 10/2020 | Qian | G06F 18/2163 |
| 2021/0253166 A1* | 8/2021 | Tomoi | B62D 15/025 |
| 2021/0300469 A1* | 9/2021 | Kubo | G06V 20/56 |
| 2021/0309294 A1* | 10/2021 | Kobayashi | B60T 8/172 |
| 2022/0009547 A1* | 1/2022 | Osajima | B62D 5/0463 |
| 2022/0024518 A1* | 1/2022 | Yang | B62D 15/0255 |
| 2022/0032994 A1* | 2/2022 | Fusconi | B62D 5/0463 |
| 2022/0063722 A1* | 3/2022 | Omikawa | B60W 50/0097 |
| 2022/0105983 A1* | 4/2022 | Omikawa | B62D 15/025 |
| 2022/0219692 A1* | 7/2022 | Taniguchi | B60W 30/12 |
| 2022/0324445 A1* | 10/2022 | Yamazaki | B62D 15/025 |
| 2022/0355864 A1* | 11/2022 | Dalzell | B62D 15/025 |
| 2023/0031839 A1* | 2/2023 | Okano | B62D 15/025 |
| 2023/0134480 A1* | 5/2023 | Varunjikar | G06F 30/20 |
| | | | 701/41 |
| 2023/0159042 A1* | 5/2023 | Kim | B60W 10/184 |
| | | | 701/43 |

* cited by examiner

ELECTRIC POWER STEERING DEVICE AND ASSISTING METHOD THEREOF

CROSS-REFERENCE TO RELATED APPLICATION

This application claims the priority benefit of China application serial no. 202210294900.6, filed on Mar. 24, 2022. The entirety of the above-mentioned patent application is hereby incorporated by reference herein and made a part of this specification.

BACKGROUND

Technical Field

The disclosure relates to an assisting device, and in particular to an electric power steering device and an assisting method thereof.

Description of Related Art

In recent years, taking into account vulnerable groups among traffic participants, there have been increasingly active efforts to provide people-friendly and sustainable traffic systems. In order to implement the target, we are focusing on research and development to further improve traffic safety and convenience through research and development of driver assistance.

Due to the advancement of technology and the demand for real-time information, there are now many equipment that can assist users in driving, so the demand of the users for the functions of the assisting equipment has greatly increased. Generally speaking, driving assisting devices often provide driving assistance according to road markings. When a vehicle is travelling on an inclined road or the vehicle is unbalanced left and right, if marking information suddenly cannot be sensed, the driving assistance will not be able to be executed, so there will be a situation where the travelling trajectory of the vehicle deviates. In addition, since the driving assistance is suddenly released, the steering load of the driver suddenly increases, and the sudden increase of the steering load of the driver easily causes traffic accidents, so the improvement of the driving assisting device is a very important topic.

SUMMARY

An electric power steering device of the disclosure is used in a vehicle and executes a steering assisting operation using a motor. The electric power steering device includes a lane recognition unit, a steering information sensing unit, and an assisting control unit. The lane recognition unit recognizes lane information of a lane on which the vehicle is travelling. The steering information sensing unit senses steering information. The assisting control unit is coupled to the motor, the lane recognition unit, and the steering information sensing unit, controls the electric power steering device to execute the steering assisting operation according to a steering assisting amount composed of the lane information and the steering information, and controls the electric power steering device to execute the steering assisting operation according to a learned steering assisting amount composed of the steering assisting amount during a learning period when the lane information cannot be recognized.

The disclosure also provides an assisting method of an electric power steering device. The electric power steering device is used in a vehicle and executes a steering assisting operation using a motor. The assisting method of the electric power steering device includes the following steps. Lane information of a lane on which the vehicle is traveling is recognized. Steering information is sensed. The electric power steering device is controlled to execute the steering assisting operation according to a steering assisting amount composed of the lane information and the steering information. The electric power steering device is controlled to execute the steering assisting operation according to a learned steering assisting amount composed of the steering assisting amount during a learning period when the lane information cannot be recognized.

DETAILED DESCRIPTION OF DISCLOSED EMBODIMENTS

Figure 1:
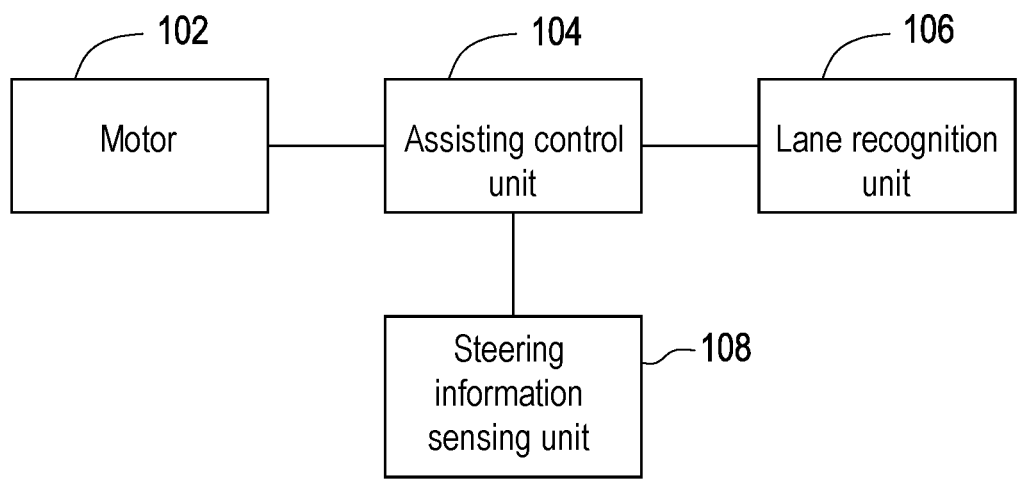
FIG. 1 is a schematic diagram of an electric power steering device used in a vehicle according to an embodiment of the disclosure.

The disclosure provides an electric power steering device and an assisting method thereof, which can continue to execute driving assistance when a reference object for executing driving assistance outside a vehicle cannot be sensed, thereby effectively improving the driving safety of the vehicle, and contributing to the development of a sustainable traffic system.

An electric power steering device of the disclosure is used in a vehicle and executes a steering assisting operation using a motor. The electric power steering device includes a lane recognition unit, a steering information sensing unit, and an assisting control unit. The lane recognition unit recognizes lane information of a lane on which the vehicle is travelling. The steering information sensing unit senses steering information. The assisting control unit is coupled to the motor, the lane recognition unit, and the steering information sensing unit, controls the electric power steering device to execute the steering assisting operation according to a steering assisting amount composed of the lane information and the steering information, and controls the electric power steering device to execute the steering assisting operation according to a learned steering assisting amount composed of the steering assisting amount during a learning period when the lane information cannot be recognized.

In an embodiment of the disclosure, the learned steering assisting amount is an average value of the steering assisting amount during the learning period.

In an embodiment of the disclosure, the assisting control unit judges whether the lane on which the vehicle is travelling is a straight lane according to the lane information and the steering information. The lane on which the vehicle is travelling is the straight lane during the learning period.

In an embodiment of the disclosure, the assisting control unit gradually changes the steering assisting amount to the learned steering assisting amount during a transitioning period.

In an embodiment of the disclosure, the assisting control unit changes from controlling the electric power steering device to execute the steering assisting operation according to the learned steering assisting amount to controlling the electric power steering device to execute the steering assisting operation according to the steering assisting amount determined by the lane information and the steering information when re-recognizing the lane information.

In an embodiment of the disclosure, the assisting control unit gradually changes the learned steering assisting amount to the steering assisting amount determined by the lane information and the steering information during the transitioning period.

The disclosure also provides an assisting method of an electric power steering device. The electric power steering device is used in a vehicle and executes a steering assisting operation using a motor. The assisting method of the electric power steering device includes the following steps. Lane information of a lane on which the vehicle is traveling is recognized. Steering information is sensed. The electric power steering device is controlled to execute the steering assisting operation according to a steering assisting amount composed of the lane information and the steering information. The electric power steering device is controlled to execute the steering assisting operation according to a learned steering assisting amount composed of the steering assisting amount during a learning period when the lane information cannot be recognized.

In an embodiment of the disclosure, the learned steering assisting amount is an average value of the steering assisting amount during the learning period.

In an embodiment of the disclosure, the assisting method of the electric power steering device includes judging whether the lane on which the vehicle is travelling is a straight lane according to the lane information and the steering information. The lane on which the vehicle is travelling is the straight lane during the learning period.

In an embodiment of the disclosure, the assisting method of the electric power steering device includes gradually changing the steering assisting amount to the learned steering assisting amount during a transitioning period.

In an embodiment of the disclosure, the assisting method of the electric power steering device includes changing from controlling the electric power steering device to execute the steering assisting operation according to the learned steering assisting amount to controlling the electric power steering device to execute the steering assisting operation according to the steering assisting amount determined by the lane information and the steering information when re-recognizing the lane information.

In an embodiment of the disclosure, the learned steering assisting amount is gradually changed to the steering assisting amount determined by the lane information and the steering information during the transitioning period.

Based on the above, in the embodiment of the disclosure, when the lane information cannot be recognized, the electric power steering device is controlled to execute the steering assisting operation according to the learned steering assisting amount composed of the steering assisting amount during the learning period. In this way, the electric power steering device is changed to being controlled to execute the steering assisting operation using the learned steering assisting amount when the lane information cannot be recognized, which can prevent the sudden disappearance of the steering assistance of the vehicle that suddenly increases the steering load of driving, so the travelling stability of the vehicle can be effectively enhanced to improve the driving safety of the vehicle.

In order for the content of the disclosure to be more comprehensible, the following specific embodiments are given as examples according to which the disclosure can indeed be implemented. In addition, wherever possible, assemblies/components using the same reference numerals in the drawings and the embodiments represent the same or similar parts.

FIG. 1 is a schematic diagram of an electric power steering device used in a vehicle according to an embodiment of the disclosure. Please refer to FIG. 1. The electric power steering device may include a motor 102, an assisting control unit 104, a lane recognition unit 106, and a steering information sensing unit 108. The assisting control unit 104 is coupled to the motor 102, the lane recognition unit 106, and the steering information sensing unit 108. The assisting control unit 104 may be, for example, a processor. The lane recognition unit 106 may, for example, include at least one of a camera, a radar, and a global satellite positioning system. The steering information sensing unit 108 may be, for example, a torque sensor. The implementations of the assisting control unit 104, the lane recognition unit 106, and the steering information sensing unit 108 of the embodiment are only exemplary embodiments, and the disclosure is in fact not limited to the implementations of the embodiment.

The lane recognition unit 106 may recognize lane information of the lane on which the vehicle is travelling. For example, the lane recognition unit 106 may recognize whether the lane on which the vehicle is travelling is a straight lane or a curved lane through recognizing road markings or traffic signs on the lane, and provide the lane information according to a recognition result. In some embodiments, the lane information may include curvature information of the lane, but not limited thereto. The steering information sensing unit 108 may be used to sense at least one of a steering torque, a steering speed, and a steering angle of a driver operating a steering wheel of the vehicle, so as to obtain steering information.

When the lane recognition unit 106 can recognize the lane, the assisting control unit 104 may control the electric power steering device to execute a steering assisting operation according to a steering assisting amount of the vehicle composed of the lane information provided by the lane recognition unit 106 and the steering information provided by the steering information sensing unit 108, so as to reduce the driving load of the driver. When the lane recognition unit 106 can recognize the lane, the assisting control unit 104 may also calculate a learned steering assisting amount according to the steering assisting amount during a learning period, so that when the lane recognition unit 106 cannot recognize the lane, the electric power steering device may be controlled to execute the steering assisting operation according to the learned steering assisting amount composed of the steering assisting amount during the learning period, so as to prevent the sudden disappearance of the steering assistance of the vehicle that suddenly increases the steering load of driving, thereby improving the driving safety of the vehicle. For example, assuming that the lane recognition unit 106 generates the lane information by recognizing markings on the lane, when the vehicle travels to a lane where markings are not drawn, the lane recognition unit 106 cannot recognize the lane information due to the disappearance of the markings, so the lane information cannot be provided. At this time, the assisting control unit 104 may change to controlling the motor 102 to execute the steering assisting operation according to the learned steering assisting amount composed of the steering assisting amount during the learning period.

Figure 2:
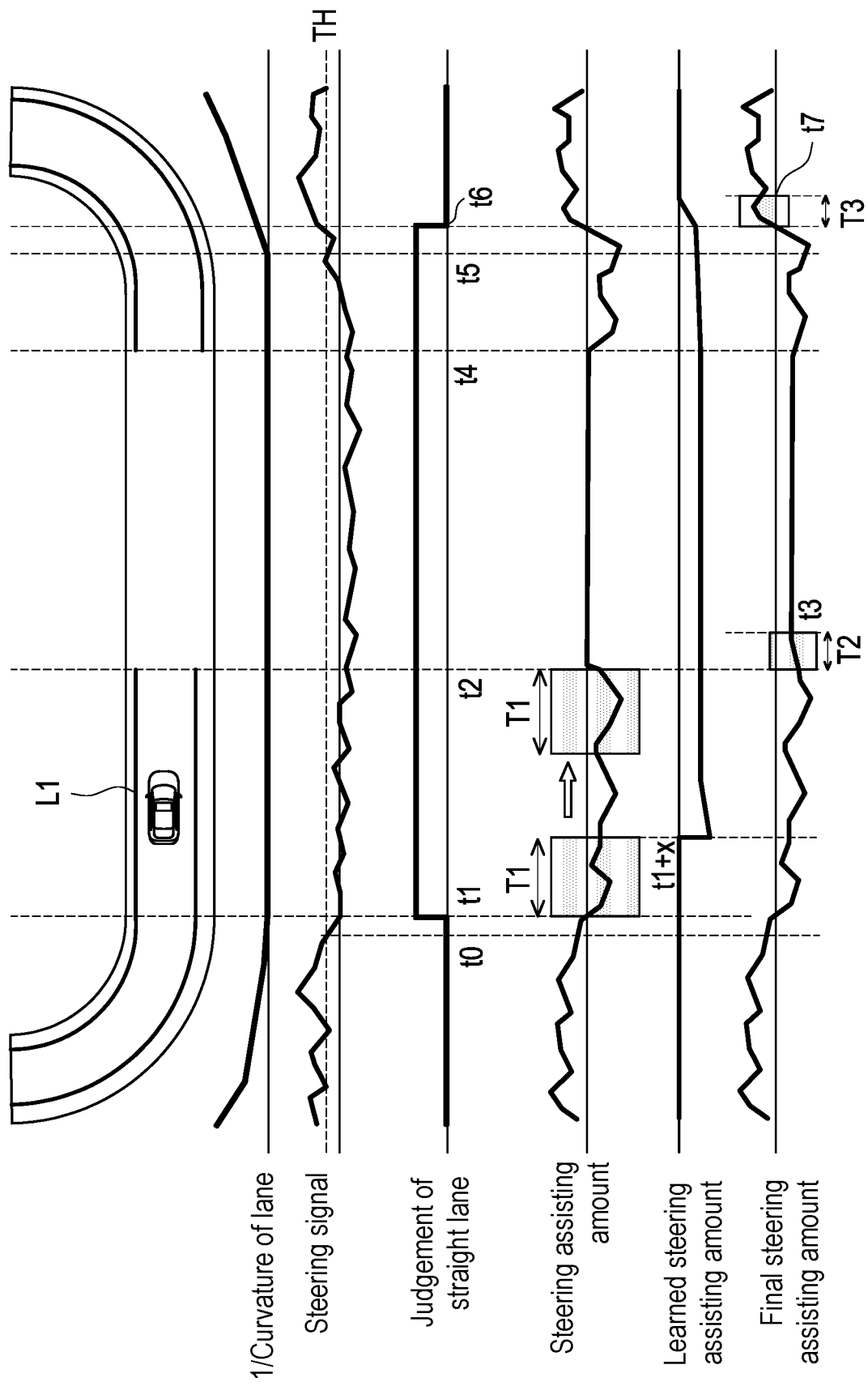
FIG. 2 is a schematic diagram of a steering assisting operation of a vehicle according to an embodiment of the disclosure.
Figure 3:
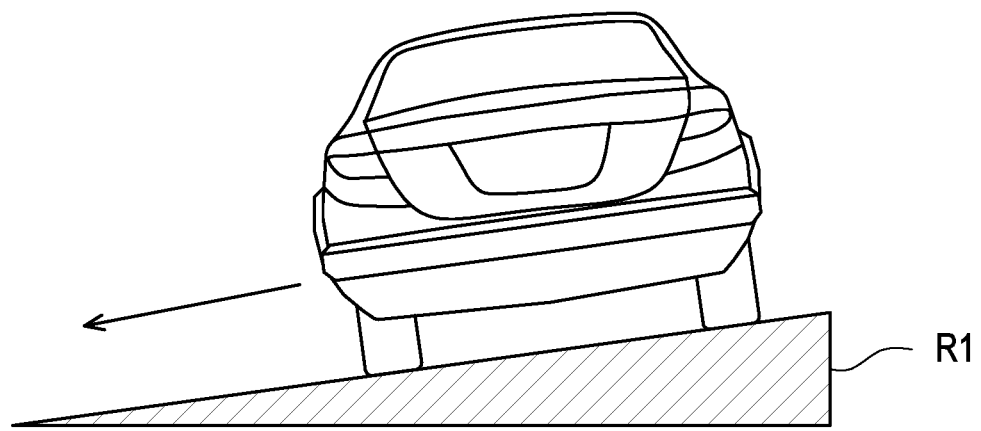
FIG. 3 is a schematic diagram of a vehicle travelling on an inclined lane according to an embodiment of the disclosure.

Further, the steering assisting operation of the vehicle may be as shown in FIG. 2. In the embodiment of FIG. 2, the vehicle enters the straight lane from the curved lane and then enters the curved lane from the straight lane. In the embodiment, the vehicle travels on a slope road R1 as shown in FIG. 3, so that the vehicle tends to deviate in the direction of the arrow shown in FIG. 3. Providing the steering assistance through the assisting control unit 104 makes it easier for the driver to keep the vehicle travelling straight along the straight lane. The assisting control unit 104 may, for example, judge whether the vehicle is travelling on the straight lane according to the curvature information of the lane provided by the lane recognition unit 106. In the embodiment, the assisting control unit 104 judges whether the vehicle is travelling on the straight lane according to the reciprocal of the curvature of the lane, but not limited thereto. When the reciprocal of the curvature of the lane is less than a default value, it may be judged that the vehicle is travelling on the straight lane. For example, in the embodiment of FIG. 2, it may be judged that the vehicle is travelling on the straight lane after a time point t1 and before a time point t5.

In addition, the assisting control unit 104 may also judge whether the vehicle is travelling on the straight lane according to a steering signal provided by the steering information sensing unit, wherein the steering signal may, for example, include at least one of the steering torque and the steering angle. Compared with the vehicle travelling on the straight lane, the steering wheel has a greater steering torque and steering angle when the vehicle is travelling on the curved lane, so it may be judged whether the vehicle is travelling on the straight lane through comparing a steering signal value with a threshold. For example, in the embodiment of FIG. 2, it may be judged whether the vehicle is travelling on the straight lane through comparing whether the steering signal value (for example, the magnitude of the steering torque or the magnitude of the steering angle of the steering wheel) is greater than a threshold TH, wherein it may be judged that the vehicle is travelling on the curved lane when the steering signal value is greater than the threshold TH (for example, before a time point t0 and after a time point t6), and it may be judged that the vehicle is travelling on the straight lane when the steering signal value is less than the threshold TH (for example, after the time point t0 and before the time point t6). As in the embodiment in FIG. 2, it may be judged that the vehicle is travelling on the straight lane at the time points t1 and t5.

In order to ensure that the vehicle is correctly judged to be travelling on the straight lane, the assisting control unit 104 may judge whether the vehicle is travelling on the straight lane according to the curvature of the lane and the steering signal at the same time, that is, it is judged that the vehicle is traveling on the straight lane when results of the two judgment manners are both that the vehicle is travelling on the straight lane. As shown in the embodiment of FIG. 2, the assisting control unit 104 may judge that the vehicle is traveling on the straight lane between the time points t1 and t6.

Figure 4:
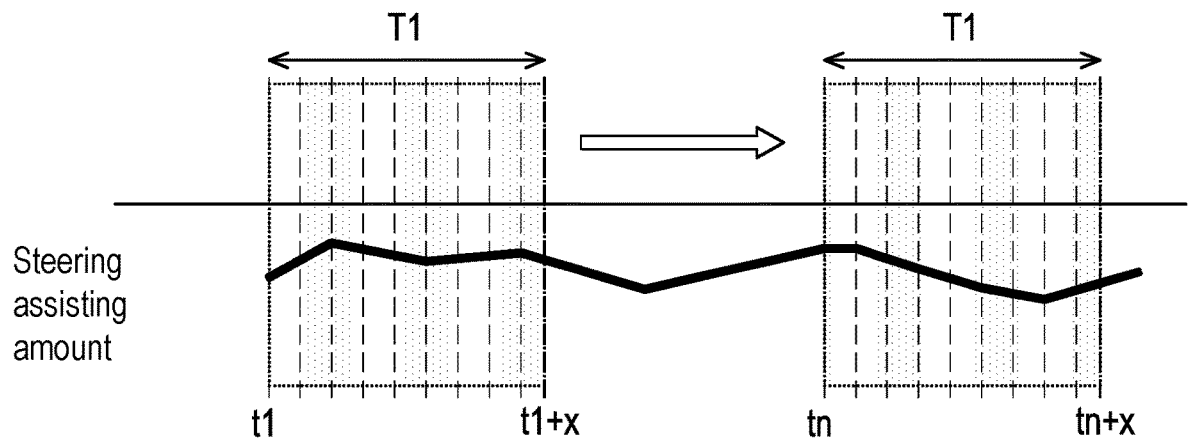
FIG. 4 is a schematic diagram of calculating a learned steering assisting amount according to another embodiment of the disclosure.

When the assisting control unit 104 judges that the vehicle is travelling on the straight lane, and the lane recognition unit 106 may still recognize the lane on which the vehicle is travelling to provide the lane information, the assisting control unit 104 calculates the learned steering assisting amount according to the steering assisting amount during the learning period, while determining the steering assisting amount (for example, the steering torque of the steering wheel) according to the lane information and the steering information. For example, in the embodiment of FIG. 2, the assisting control unit 104 may start to calculate the learned steering assisting amount at the time point t1 according to the steering assisting amount during a learning period T1, for example, calculate the learned steering assisting amount according to the steering assisting amount in the latest period. Further, the learning period T1 may be as shown in FIG. 4 and has a time length of x seconds. Assuming that the current time point is t1+x, the assisting control unit 104 may calculate the learned steering assisting amount according to the steering assisting amount between the time points t1 and t1+x. For example, the steering assisting amount may be sampled at a fixed frequency, and an average value of the steering assisting amount sampled during the learning period T1 may be calculated as the learned steering assisting amount, so as to further reduce the discomfort of the driver. The learned steering assisting amount may be continuously updated over time. For example, the learned steering assisting amount at a time point tn+x may be the average value of the steering assisting amount sampled between time points to and tn+x, where n and x are positive integer. The time length of the learning period T1 may be determined, for example, according to the reciprocal of the sampling frequency of the steering assisting amount, for example, twice the reciprocal of the sampling frequency of the steering assisting amount, wherein the value of the sampling frequency may be designed as a frequency that does not make the driver feel uncomfortable, but not limited thereto.

Figure 5:
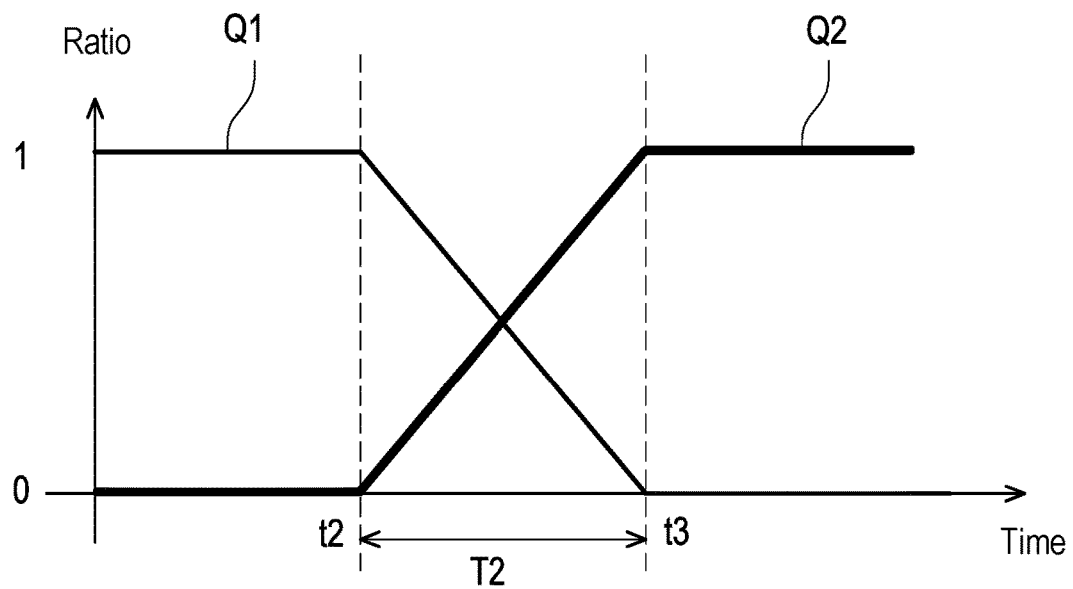
FIG. 5 is a schematic diagram of adjusting a steering assisting amount according to an embodiment of the disclosure.

In the embodiment of FIG. 2, at a time point t2, when the lane recognition unit 106 can no longer recognize the lane due to the disappearance of a marking L1 and cannot provide the lane information, the assisting control unit 104 may control the motor 102 to execute the steering assisting operation according to the learned steering assisting amount corresponding the time point t2. Further, the assisting control unit 104 may gradually change the steering assisting amount to the learned steering assisting amount during a transitioning period T2, so as to further prevent the sudden increase of the steering load of the driver. For example, as shown in FIG. 5, the assisting control unit 104 may calculate a final steering assisting amount during the transitioning period T2 according to a steering assisting amount Q1 determined by the lane information and the steering information at the time point t2 and a learned steering assisting amount Q2 calculated at the time point t2, and control the motor 102 to execute the steering assisting operation according to the final steering assisting amount. For example, during the transitioning period T2, the final steering assisting amount at each time point may be, for example, equal to the sum of the corresponding steering assisting amount Q1 and learned steering assisting amount Q2, and as time goes by, the ratio of the steering assisting amount Q1 in the final steering assisting amount decreases and the learned steering assisting amount Q2 increases. In the embodiment, when the transitioning period T2 ends (that is, a time point t3), the final steering assisting amount is equal to the learned steering assisting amount Q2, but not limited thereto.

Similarly, when the marking L1 appears again and the lane recognition unit 106 can recognize the lane again, the assisting control unit 104 may gradually change the learned steering assisting amount to the steering assisting amount composed of the lane information and the steering information during a transitioning period T3, and the changing manner may be, for example, similar to the implementation of the embodiment of FIG. 5, which will not be repeated here. It is worth noting that in the embodiment, since the vehicle continues to travel on the straight lane, the learned steering assisting amount may be continuously used for the steering assisting operation. There is no need to set the transitioning period T3 at a time point t4 when the marking L1 appears, and the transitioning period T3 (time points t6 to t7) may be entered when the vehicle travels to the curved lane. However, in other embodiments, the starting position of the transitioning period T3 may also be set at the time point t4 when the marking L1 appears. It is worth noting that the embodiment is an example of the vehicle travelling on the straight lane to illustrate the steering assistance of the vehicle, but not limited thereto. In other embodiments, the steering assistance of the vehicle on the curved lane may also be performed in the same manner.

Figure 6:
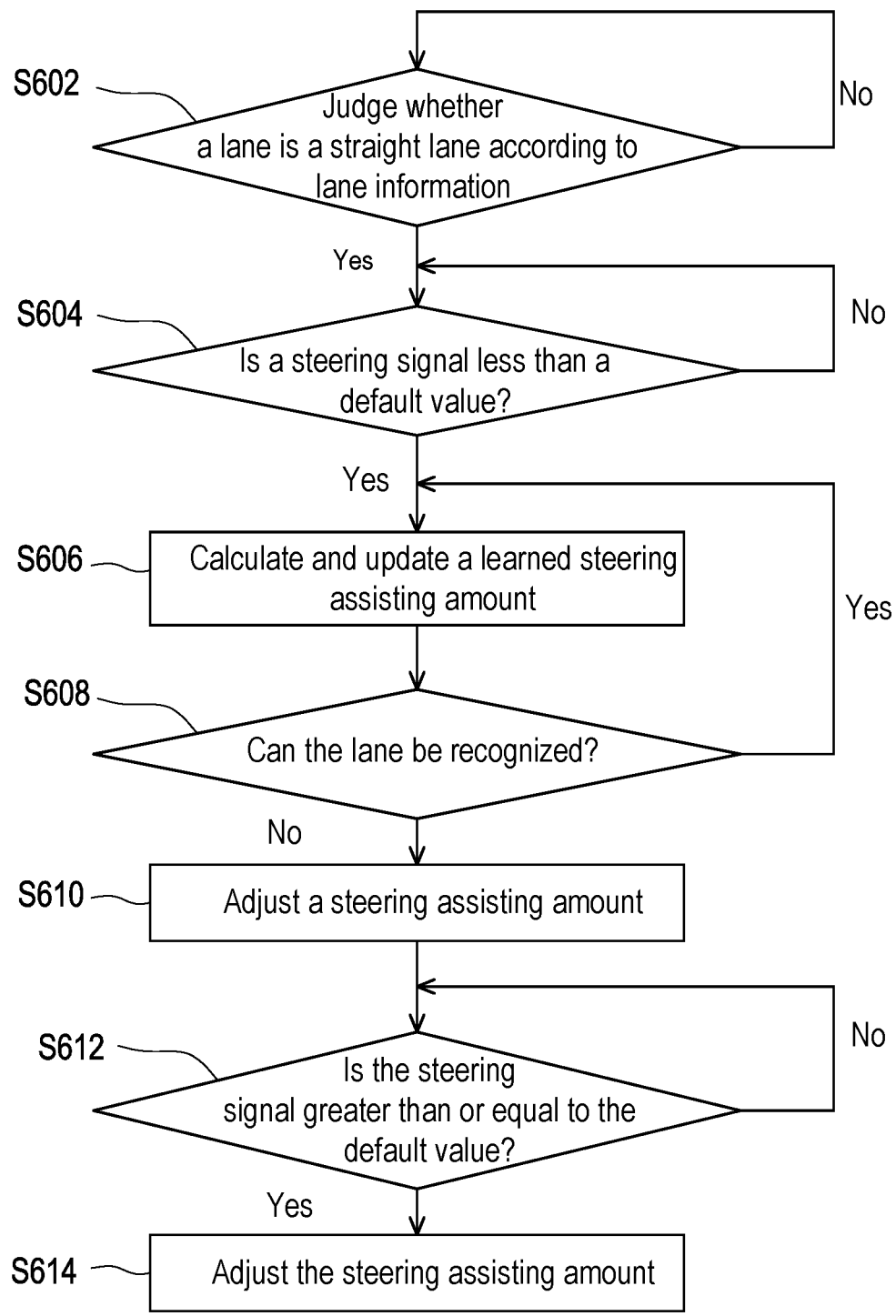
FIG. 6 is a flowchart of an assisting method of an electric power steering device used in a vehicle according to an embodiment of the disclosure.

As described in the above embodiment, an assisting method of an electric power steering device used in a vehicle may be, for example, as shown in FIG. 6. First, it is judged whether a lane on which a vehicle is travelling is a straight lane according to lane information (Step S602). For example, it may be judged whether the vehicle is travelling on the straight lane according to the reciprocal of the curvature of the lane. It may be judged that the vehicle is travelling on the straight lane when the reciprocal of the curvature of the lane is less than a default value. If it is judged that the vehicle is travelling on the straight lane, it may then be judged whether a steering signal is less than a default value (Step S604). For example, it may be judged whether a steering torque of a steering wheel is less than a threshold. It may be judged that the vehicle is travelling on the straight lane when the steering torque of the steering wheel is less than the threshold. After judging that the vehicle is travelling on the straight lane through Steps S602 and S604, a steering assisting amount may be determined according to the lane information and steering information, and a learned steering assisting amount may be calculated and updated according to the steering assisting amount during a learning period (Step S606). Then, it is judged whether the lane can be recognized (Step S608), if the lane can still be recognized, return to Step S606 to continue to calculate and update the learned steering assisting amount, and if the lane cannot be recognized, the steering assisting amount is adjusted (Step S610). For example, a final steering assisting amount during the transitioning period T2 is calculated to perform a steering assisting operation according to the final steering assisting amount. After that, it may be judged whether the steering signal is greater than or equal to the default value (Step S612). For example, it may be judged whether the steering torque of the steering wheel is greater than or equal to the threshold. It may be judged that the vehicle is travelling on a curved lane when the steering torque of the steering wheel is greater than or equal to the threshold. Afterwards, the steering assisting amount may then be adjusted (Step S614). For example, the steering assisting amount during the transitioning period T3 may be adjusted, that is, the assisting control unit 104 may gradually change the learned steering assisting amount to the steering assisting amount determined by the lane information and the steering information during the transitioning period. In addition, after the vehicle enters the curved lane, the assisting control unit 104 may also calculate the learned steering assisting amount according to the steering assisting amount during the learning period as described in the above embodiment, so that when the lane recognition unit 106 cannot recognize the lane, the motor 102 may be controlled to execute the steering assisting operation according to the learned steering assisting amount. Since the learned steering assisting amount is continuously updated, the learned steering assisting amount calculated by the assisting control unit 104 when the vehicle is travelling on the curved lane overwrites the learned steering assisting amount previously calculated when the vehicle is travelling on the straight lane.

Figure 7:
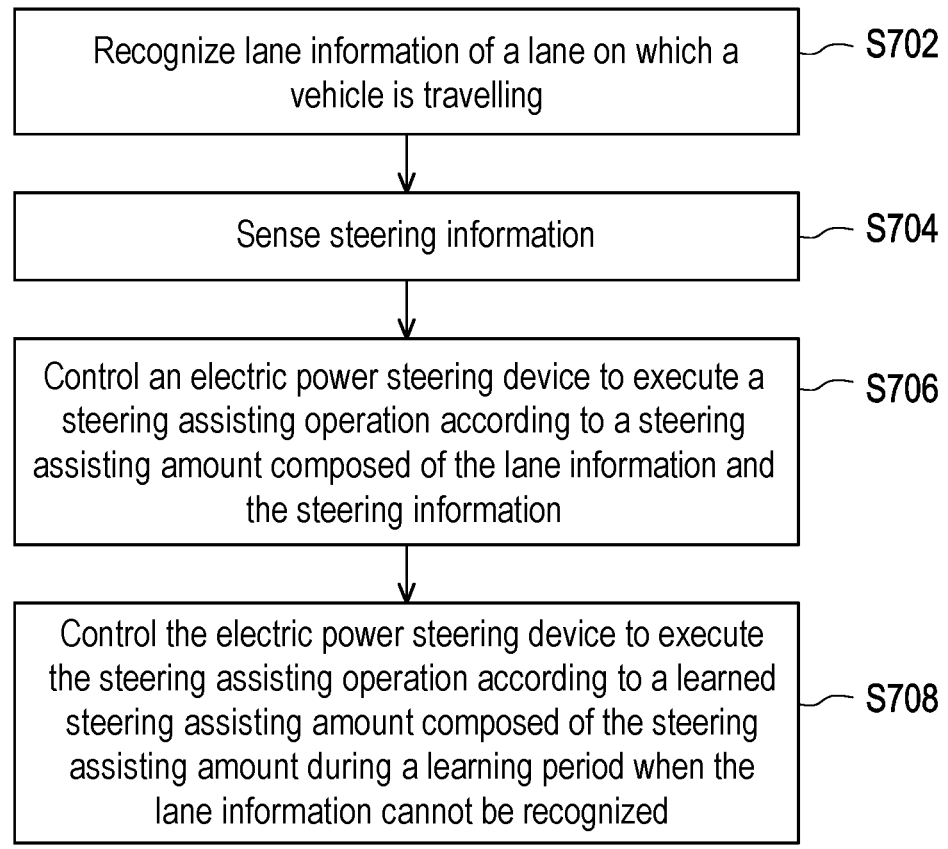
FIG. 7 is a flowchart of an assisting method of an electric power steering device used in a vehicle according to another embodiment of the disclosure.

FIG. 7 is a flowchart of an assisting method of an electric power steering device used in a vehicle according to another embodiment of the disclosure. It can be known from the above embodiment that the assisting method of the electric power steering device may at least include the following steps. First, lane information of a lane on which a vehicle is travelling is recognized (Step S702). The lane information may, for example, include curvature information of the lane, but not limited thereto. Next, steering information is sensed (Step S704). The steering information may, for example, include at least one of a steering torque, a steering speed, and a steering angle, but not limited thereto. Then, the electric power steering device is controlled to execute a steering assisting operation according to a steering assisting amount composed of the lane information and the steering information (Step S706). Afterwards, the electric power steering device is controlled to execute the steering assisting operation according to a learned steering assisting amount composed of the steering assisting amount during a learning period when the lane information cannot be recognized (Step S708). For example, the learned steering assisting amount may be, for example, an average value of the steering assisting amount during the learning period, but not limited thereto. In addition, the steering assisting amount may be gradually changed to the learned steering assisting amount during a transitioning period. For example, the ratio of the steering assisting amount to the learned steering assisting amount may be adjusted over time, and the sum of the steering assisting amount and the learned steering assisting amount may be taken as a final steering assisting amount. The electric power steering device is controlled to execute the steering assisting operation according to the final steering assisting amount.

In addition, the above embodiment is an example of the vehicle travelling on the straight lane to illustrate the steering assistance of the vehicle, but not limited thereto. In other embodiments, the steering assistance of the vehicle on the curved lane (that is, during the period of the vehicle turning) may also be performed in the same manner. For example, the learned steering assisting amount may be used to control the electric power steering device to execute the steering assisting operation when the lane information cannot be recognized, and the transitioning period may be set to prevent the sudden increase of the steering load of the driver. Since the manner of controlling the electric power steering device to execute the steering assisting operation when the vehicle is travelling on the curved lane is similar to the manner of controlling the electric power steering device to execute the steering assisting operation when the vehicle is travelling on the straight lane in the above embodiment, persons skilled in the art should be able to infer the implementation of the steering assistance when the vehicle is travelling on the curved lane according to the above embodiments, so details are not repeated here.

In summary, in the embodiment of the disclosure, when the lane information cannot be recognized, the electric power steering device is controlled to execute the steering assisting operation according to the learned steering assisting amount composed of the steering assisting amount during the learning period. In this way, the electric power steering device is changed to being controlled to execute the steering assisting operation using the learned steering assisting amount when the lane information cannot be recognized, which can prevent the sudden disappearance of the steering assistance of the vehicle that suddenly increases the steering load of driving, so the driving safety of the vehicle can be effectively improved.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. An electric power steering device, the electric power steering device being used in a vehicle and executing a steering assisting operation using a motor, comprising:
    a lane recognition unit, recognizing lane information of a lane on which the vehicle is travelling;
    a steering information sensing unit, sensing steering information; and
    an assisting control unit, coupled to the motor, the lane recognition unit, and the steering information sensing unit, controlling the electric power steering device to execute the steering assisting operation according to a steering assisting amount composed of the lane information and the steering information, and when the lane information cannot be recognized, controlling the electric power steering device to execute the steering assisting operation according to a learned steering assisting amount composed of the steering assisting amount during a learning period, wherein the assisting control unit judges whether the lane on which the vehicle is travelling is a straight lane according to the lane information and the steering information, the lane on which the vehicle is travelling during the learning period is the straight lane, the learning period starts when the vehicle is detected traveling on the straight lane, when the assisting control unit judges that the lane on which the vehicle is travelling is the straight lane, the assisting control unit calculates the learned steering assisting amount during the learning period, and when the lane recognition unit cannot recognize the lane information while the vehicle is traveling on the straight lane, the assisting control unit controls the electric power steering device to execute the steering assisting operation according to the learned steering assisting amount calculated during the learning period.

2. The electric power steering device according to claim 1, wherein the assisting control unit changes from controlling the electric power steering device to execute the steering assisting operation according to the learned steering assisting amount to controlling the electric power steering device to execute the steering assisting operation according to the steering assisting amount determined by the lane information and the steering information when re-recognizing the lane information.

3. The electric power steering device according to claim 2, wherein the assisting control unit gradually changes the learned steering assisting amount to the steering assisting amount determined by the lane information and the steering information during a transitioning period.

4. The electric power steering device according to claim 1, wherein the learned steering assisting amount is an average value of the steering assisting amount during the learning period.

5. The electric power steering device according to claim 1, wherein the assisting control unit gradually changes the steering assisting amount to the learned steering assisting amount during a transitioning period.

6. An assisting method of an electric power steering device, the electric power steering device being used in a vehicle and executing a steering assisting operation using a motor, comprising:
    recognizing lane information of a lane on which the vehicle is traveling;
    sensing steering information;
    controlling the electric power steering device to execute the steering assisting operation according to a steering assisting amount composed of the lane information and the steering information;
    when the lane information cannot be recognized, controlling the electric power steering device to execute the steering assisting operation according to a learned steering assisting amount composed of the steering assisting amount during a learning period;
    judging whether the lane on which the vehicle is travelling is a straight lane according to the lane information and the steering information, wherein the lane on which the vehicle is travelling during the learning period is the straight lane, and the learning period starts when the vehicle is detected traveling on the straight lane;
    when the lane on which the vehicle is travelling is the straight lane, calculating the learned steering assisting amount during the learning period; and
    when the lane information cannot be recognized while the vehicle is traveling on the straight lane, controlling the electric power steering device to execute the steering assisting operation according to the learned steering assisting amount calculated during the learning period.

7. The assisting method of the electric power steering device according to claim 6, comprising:
    changing from controlling the electric power steering device to execute the steering assisting operation according to the learned steering assisting amount to controlling the electric power steering device to execute the steering assisting operation according to the steering assisting amount determined by the lane information and the steering information when re-recognizing the lane information.

8. The assisting method of the electric power steering device according to claim 7, wherein the learned steering assisting amount is gradually changed to the steering assisting amount determined by the lane information and the steering information during a transitioning period.

9. The assisting method of the electric power steering device according to claim 6, wherein the learned steering assisting amount is an average value of the steering assisting amount during the learning period.

10. The assisting method of the electric power steering device according to claim 6, comprising: gradually changing the steering assisting amount to the learned steering assisting amount during a transitioning period.

* * * * *